UNITED STATES PATENT OFFICE 2,457,872

VULCANIZABLE COPOLYMERS OF A VINYL ARYL COMPOUND, BUTADIENE AND MALEIC ESTERS

Gaetano F. D'Alelio, Cleveland, Ohio, assignor to Pro-phy-lac-tic Brush Company, Northampton, Mass., a corporation of Delaware No Drawing. Application December 11, 1946, Serial No. 715,599

2 Claims. (Cl. 260—78.5)

This invention relates to new polymerization products and particularly to vulcanizable compositions. More specifically it relates to certain novel resinous compositions which are copolymers of certain butadienes; certain polymerizable substituted aryl compounds; and a certain monohydric alcohol diester of maleic acid.

Another object of this invention is a method or process of preparing such convertible polymers from a mixture whose polymerizable components comprise substantially a butadiene-1,3; a polymerizable substituted aryl compound; and a monohydric alcohol ester of maleic acid.

A further purpose of the invention is an interpolymer of a vinyl aryl and of a diene-1,3 internally modified with monohydric alcohol esters of maleic acid.

In the practice of the invention, I may use a butadiene-1,3 having the formula

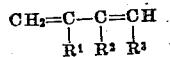

wherein $R^1$ and $R^2$ are a hydrogen or a hydrocarbon radical, for example, methyl, ethyl, propyl, butyl, isobutyl, amyl, isoamyl, hexyl, cyclopentyl, cyclohexyl, methyl cyclohexyl, phenyl, tolyl, a chlorine substituted hydrocarbon, such as chlortolyl, chlorphenyl, and $R^3$ is selected from the group consisting of hydrogen and methyl, and when $R^3$ is methyl, $R^1$ is methyl and $R^2$ is hydrogen.

Specific examples of the 1,3-butadienes are butadiene - 1,3 itself; 2 - methyl butadiene - 1,3; 2,3-dimethyl butadiene-1,3; 2-methyl pentadiene-1.3 (2,4-dimethyl butadiene-1,3); 2-phenyl butadiene-1,3; 2,3-diphenyl butadiene-1,3; pentadiene-1,3; etc.

In the practice of the invention, I may use a vinyl aryl compound or similar compounds of the structure $$CH_2=CR'Z$$

wherein $R'$ is hydrogen or a methyl radical and Z is an aryl radical or a substituted aryl radical, examples of which are phenyl; the chlorphenyls; for example, the mono-, di-, and tri-chlorphenyls; the nitrophenyls; tolyl; the carbalkoxy-phenyls; for example, the methyl, ethyl, and propyl derivatives, etc.

As specific examples of the polymerizable substituted aryl compounds may be mentioned styrene, isopropenyl benzene, isopropenyl toluene, monochlorstyrene, dichlorstyrene, trichlorstyrene, vinyl methyl benzoate, vinyl ethyl benzoate, nitrostyrene, nitrovinyl toluene, etc.

The monohydric alcohol esters of maleic acid which may be used have the general formula $$ROOCCH=CHCOOR$$

wherein R represents the residue of a monohydroxy alcohol; the only requirement of the alcohol is that it possess at least one esterifiable hydroxyl group and is devoid of ethylenic and acetylenic saturation.

As examples of alcohols from which the maleic esters may be prepared, I use aliphatic monohydric alcohols, namely methyl, ethyl, propyl, isopropyl, butyl, isobutyl, amyl, secondary amyl, isoamyl, mixed amyl, and hexyl alcohols.

I am aware that reactions of fumaric and maleic esters with other vinyl derivatives have heretofore been known; for example, the Diels-Alder reaction, between a diene-1,3 and a maleic derivative, is well known in the chemical literature.

As a typical example of the Diels-Alder reaction may may be mentioned the reaction between butadiene and maleic anhydride. In this case a 1,4-addition of the maleic anhydride to the butadiene occurs, resulting in a non-polymeric, non-resinous addition product, for example

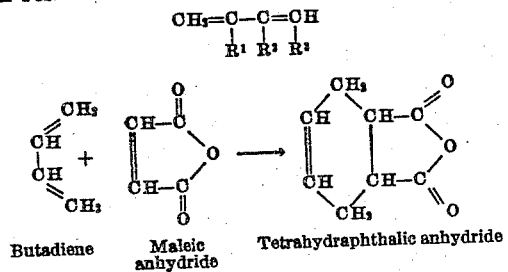

Butadiene    Maleic anhydride    Tetrahydraphthalic anhydride

When a diester of maleic acid, for example, diethyl or dimethyl maleate, is used, the corresponding ester of tetrahydraphthalic anhydride is obtained, for example

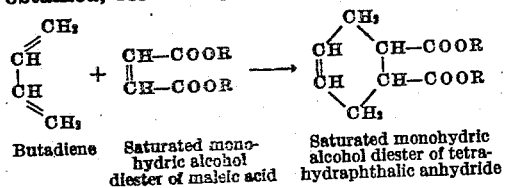

Butadiene    Saturated monohydric alcohol diester of maleic acid    Saturated monohydric alcohol diester of tetrahydrophthalic anhydride The saturated monohydric alcohol esters of tetrahydraphthalic anhydride are non-resinous, nonplastic materials of low molecular weight.

I am also aware that copolymers of vinyl aryl compounds with saturated monohydric alcohol esters of maleic acid have previously been known.

As a typical example mention may be made of the styrene-maleic anhydride and the styrene-diethyl maleate copolymers. These copolymers are thermoplastic, non-vulcanizable compositions which possess the structure according to the reaction as follows:

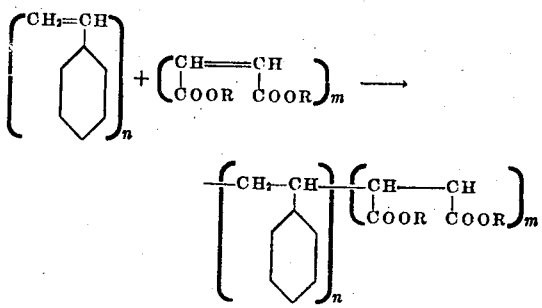

where the numerical value of $n$ bears a mol ratio to $m$ of at least one. Such copolymers are thermoplastic and soluble and cannot be converted to the insoluble, infusible state.

In view of the above chemical reactions, two things are surprising. First, that a tri-polymer results rather than a mixture of the reaction product of the Diels-Alder reaction and the vinyl aryl compound, and second, that the product is a typical resin being in one state soluble and fusible, and in a second state, i. e., after further polymerization, insoluble and infusible.

As stated, it is possible through the use of this invention to prepare vulcanizable plastic compositions, as for example, when the styrene component is in the major proportion. Such compositions are truly resinlike since they are capable of being molded without the addition of plasticizers; they are not rubber-like since they are amenable to mechanical working, such as punching and drilling.

If so desired, they may likewise be cured with vulcanizing agents, thereby increasing their solvent resistance and their toughness. Such compositions possess greater ductility than the corresponding composition of styrene and butadiene from which the maleic ester has been omitted in the polymerization process.

It is thereby seen that the compositions of this invention possess a greater utility than it is possible to achieve by condensing or polymerizing separately (1) the styrene with the butadiene, (2) the styrene with the diethyl maleate, or (3) the diethyl maleate with the butadiene.

Example 1 indicates the wide range of polymers that may be obtained in the practice of this invention.

The objects of this invention are achieved by polymerizing a mixture comprising the ratios of 30 to 90 parts of the polymerizable substituted aryl compound; 5 to 30 parts of the butadiene-1,3; and 5 to 40 parts of the saturated monohydric alcohol ester of maleic acid. Depending on the proportions of the ingredients used, compositions suitable as molding compounds which may be used directly in the preparation of molded parts or further treated with vulcanizing or curing agents.

The fumaric esters are not to be considered the equivalent of the maleic esters in the practice of this invention. As is well known, the fumaric esters are much more active and polymerize at a much higher rate than the maleic esters, when used under active polymerization conditions. When fumaric esters are used in conjunction with the dienes, larger quantities of the tetrahydraphthalic esters are formed by the Diels-Alder reaction than when the corresponding maleic esters are used. The tetrahydraphthalic esters do not copolymerize with the remaining ingredients and thereby act as diluent plasticizers producing a softer polymerization product only because of the plasticizer formed by the fumaric acid ester and the butadiene. This is not altogether desirable since it is difficult to remove the plasticizer from such compositions. It is further undesirable in the finished product however because no control may be exercised on the amount of plasticizer added, and if a fumaric ester of a low-boiling alcohol had been used, this plasticizer may be too fugitive to be permanently retained by the finished articles. The marked difference in the maleic and fumaric esters is observed in the preparations of the allyl esters of maleic and fumaric acid. Diallyl maleate may be readily distilled at low pressures, of the order of 50 mm. in the presence of such active inhibitors as copper, without polymerization of the mass in the distillation retort. On the other hand, the distillation of diallyl fumarate in the same equipment and under the same conditions and with the same amount of polymerization inhibitor usually results in the loss of 50 to 70% of the diallyl maleate in the distillation retort. A more permanent internal plasticizing effect, i. e. by copolymerization, is obtained when the maleic esters are used and become integral parts of the polymer molecule.

The internal plasticizing effect of the copolymerized monohydric alcohol ester is so high that no particular advantage appears to accrue from the use of higher quantities.

Any suitable method may be used for the preparation of the polymers of this invention; however, emulsion methods are preferred. When my novel materials are prepared by emulsion polymerization, any substance may be used as the emulsifying agent which, when dispersed in water containing the polymerizable and other ingredients, is capable of producing a permanent dispersion of the reactive ingredients in water. The most suitable dispersion or emulsifying agents are those which give stable emulsions without promoting hydrolysis of the ester to any undesirable degree.

Additional examples of emulsifying agents besides the sodium oleate used in Example 1 are Ivory soap, the sodium salts of sulfonated long-chain alcohols, the water-soluble salts of sulfosuccinic esters, N-stearyl betaine, cetyl trimethyl ammonium bromide, soluble lignin sulfonic acid salts, C-cetyl betaine, etc. Usually a 2 to 4% solution of an emulsifying agent in water is suitable in the preparation of a good dispersion, but a range of 2/10 to 10% may be used when a weaker or stronger solution is desired.

Many of the polymers of this invention may likewise be prepared in granular form and in this case agents are used which have relatively poor dispersing properties whereby they form nuclei for the formation of granules of the tri-polymers. Such agents are usually called granulating agents and this process may be defined as the method of preparing these copolymers in granular form which comprises dispersing the polymerizable mixture in water by means of a protective colloid and polymerizing the mixture under agitation. The concentration of the granulating agent or protective colloid is adjusted so that it is not substantially greater than the amount of agent sufficient to maintain the polymerizable mixture in the dispersed phase while agitation is maintained and is sufficient to prevent adhesion or coagulation of the dispersed particles during the polymerization process.

Examples of such protective colloids and granulating agents are soluble starch, methyl starch, polyvinyl alcohol, partially hydrolyzed polyvinyl acetate, gelatine, sodium halogenate soluble salts of cellulose, glycolate soluble salts of starch, glycol soluble salts of polyvinyl alcohol glycolate, polymethacrylic acid, natural gums, etc.

Usually a concentration of $\frac{1}{10}$ to 1% of a granulating agent in water is satisfactory. The quantities, however, are adjusted to the dispersing power of the protective colloid.

As catalyst for the polymerization I may use any effective oxygen liberating agent, such as benzoyl peroxide, sodium persulfate, potassium persulfate, sodium perborate, potassium perborate, hydrogen peroxide, stearyl peroxide, hyperperoxides, etc. Any suitable amount of catalyst may be used depending upon the nature of the catalyst. In general, between $\frac{1}{10}$ and 1½% of catalyst is used depending on the nature of the catalyst and upon the desired rate of polymerization.

The course of polymerization of the monomeric mixture used in the preparation of the polymers of this invention may be modified considerably by the presence of other ingredients used to modify or control the reaction. Thus, I may use small amounts of sulfur; hydroquinone; copper; naphthyl amine; carbon tetrachloride; pyrogallol; the higher mercaptans; the thiurams; the dithiurams; ferrous and ferric salts, such as the tartrates, citrates, lactates; finely dispersed metals; halogenated amides, etc.

The ratio of the dispersed phase, that is, the mixture of the polymerizable monomers, to the water used with the emulsifying agent or protective colloid as the dispersing phase, may be varied widely. Satisfactory results are obtained in the range of 100 parts of monomer mixture to 100–500 parts of the dispersing phase.

Auxiliary organic solvents such as dioxane, ethyl alcohol, glycols, benzene, etc. may likewise be used in the presence of the dispersed and dispersing phases.

These ingredients may be added directly to the polymerizable mixture or may be present as diluents in the reacting ingredients. Thus, the butadiene as prepared by the catalytic dehydrogenation of the butenes may contain some butane as well as some butene-1 and butene-2.

Likewise, the styrene may contain definite quantities of xylene or diethyl benzene or may even be derived from carbureted water gas and contain many other polymerizable and unpolymerizable materials.

The maleic ester may likewise contain small quantities of a monoester as evidenced by the acid number of the technical grade materials.

The fundamental resins of this invention likewise may be modified by other polymerizable monomers containing a single ethylenic polymerizable double bond. Illustrative examples of such compounds are the vinyl halides, e. g., vinyl chloride; the vinylidene halides, e. g. vinylidene chloride, vinylidene fluorochloride, etc.; the esters of acrylic acid, e. g., methyl acrylate, ethyl acrylate, ethyl methacrylate, methyl methacrylate, methyl chloracrylate, fluorophenyl acrylate, etc.; the substituted aryl ethylenes, e. g., bromotoluyl ethylene, etc.; the vinyl esters, e. g., vinyl acetate, vinyl propionate, vinyl butyrate, vinyl benzoate; the nitrile derivatives of acrylic and methacrylic acid, e. g., acrylonitrile, methacrylonitrile, etc.; methylene malonic esters; the monoalkyl esters, e. g., the methyl ester; the diesters, e. g., the dimethyl ester, the dipropyl ester, etc.; the allyl derivatives, e. g.; acrolein, methacrolein, vinyl methyl ketone, vinyl ethyl ketone, allyl chloride, vinyl methyl ether, vinyl ethyl ether, vinyl propyl ether, allyl phenyl ether, allyl acetate, allyl propionate, allyl benzoate, vinyl ethyl ketone, etc.

If desired, the polymerization may be carried out as a mass polymerization, that is, the polymerizable ingredients are reacted in the absence of dispersing agents or solvents. The preparation of suitable varnishes or coating compositions may be accomplished by the use of organic solvents of the hydrocarbon and halogenated hydrocarbon types.

In any of the above polymerization methods, the reaction may be carried out conveniently at 45° to 60° C. within a few days depending on the composition of the ingredients, the amount of catalyst, etc. It is possible with higher catalyst concentrations or with increased temperatures to decrease the reaction time to five to seven hours.

When the gaseous derivatives of butadiene-1,3 are used, the higher temperatures are to be avoided. The choice of the polymerization temperature, as is readily seen, depends on the choice of ingredients, of catalyst, of ratio of the dispersed to the dispersing phases, and the type of equipment employed.

The emulsified or dispersed polymers may be coagulated by any of the methods applicable to the dispersed polymer relative to the particular emulsifying or dispersion agent used. In many cases solutions of aluminum sulfate are satisfactory when added slowly and with stirring. Sodium chloride solutions, preferably those containing free acids, such as sulfuric, hydrochloric, or acetic acid, are preferable because of low cost. Alternately, the emulsion may be broken by freezing or heating, thereby eliminating the addition of foreign or electrolytic material to the polymer. In many cases the addition of a lower alcohol, such as methyl or ethyl alcohol satisfactorily breaks the emulsion.

In the ordinary method of producing granular polymers, precipitants are not usually required, but should a small amount of emulsion be obtained with the granular product, the resin contained in the emulsion may be precipitated by any of the means mentioned above.

In many cases where films or molded products of the copolymers of this invention are to be used unvulcanized and are required to withstand prolonged aging, it is desirable to add a small amount of antioxidant to such compositions. This is particularly true when the compositions contain high amounts of styrene and are intended for use as an unvulcanized thermoplastic.

As suitable oxidation inhibitors may be mentioned N-phenyl beta naphthyl amine, hydroquinone, eugenol, and similar substances, the amount needed being small, of the order of $\frac{1}{10}$ to 2% of the weight of the interpolymer.

Many of the copolymers of this invention, particularly those high in styrene, are soluble in low cost hydrocarbon solvents and, as such, are well adapted as film-forming materials etc. These solutions may be used with or without vulcanizing or curing agents. When made in suitable equipment and under favorable conditions, the films are practically colorless. Furthermore, they are strong, tough and flexible. Adhesion of these films to base materials, such as wood, metal, glass, and the like is excellent. Such unpigmented solutions are useful as clear varnishes, lacquers, coating compositions, adhesives, etc., whereas the pigmented solutions are suitable for coating compositions, such as paints and pigmented lacquers for wood, metal, paper, leather, cloth, cork, asbestos board, etc.

Unpigmented copolymer solutions or emulsions of the copolymer are suitable for impregnating or coating papers and textiles, cellular and other fibrous bodies, and porous or semi-porous materials to contribute to their strength, toughness, imperviousness to moisture, flexibility, etc.

The molding compositions prepared from such bodies, particularly those of a plastic nature rather than a rubber-like nature possess the ability to withstand bending pressures when such pressure is applied slowly. These compositions are ideally suited for the preparation of articles that are usually subjected to bending strains such as combs, or wiring of electrical equipment, panel boards, leather, etc.

The polymers of this invention containing in general less than 50% of butadiene are of the nature of ductile synthetic resinous compositions capable of being vulcanized in the usual fashion to yield cured compositions with increased heat and solvent resistance.

For example, a resin-like product may be made by copolymerizing a mixture of about 50 to 90 parts of a vinyl aryl compound, about 5 to 30 parts of a butadiene-1,3 and about 5 to 40 parts of a saturated monohydric alcohol ester of maleic acid.

The compatibility of these new compositions with plasticizers is higher than that of the normal styrene-butadiene composition. This is attributed to the fact that the ester groups of maleic derivatives, which have interpolymerized with the other ingredients, offer wider possibilities in the selection of suitable plasticizers.

Among the plasticizers suitable for use in this invention are tricresyl phosphate, dibenzyl sebacate, dibutyl sebacate, diethylene glycol dihexoate, dibutoxy ethyl sebacate, dicrotyl azeleate, tributyl citrate, chlorinated diphenyls, octyl phthalate, cyclohexyladipate, benzyl borate, dibenzyl ether, octyl chlorbenzoate, glycerol trilevulinate, ethylene glycol butyl phthalate, tetrahydrofurfuryl sebacate, tetrahydrofurfuryl fumarate, tributyl aconitate, etc. A wide variety of plasticizers may be used because of the solvation effect of the maleic ester group in the tripolymer.

The fundamental products of this invention may be likewise compounded with other synthetic resins and other synthetic rubbers. They may be blended with the unsaturated alkyd resins, plasticized polyvinyl chloride resins, the polyvinyl acetal resins, with pigments, fillers, dyes, lubricants, softeners, etc.

The vulcanization of these polymers may be accomplished in the standard method of vulcanizing natural or synthetic rubber with or without reinforcing agents, such as carbon black, etc.

As accelerators in conjunction with sulfur there may be used the aldehyde amines, the guanidines, the carbon disulfide derivatives or mixtures of such materials. Some typical examples are heptaldehyde-aniline, butyraldehyde butyl amine, diphenylguanidine, di-o-toluylguanidine, triphenylguanidine, zinc dimethyl dithiocarbamate, zinc dibutyl dithiocarbamate, tetramethyl thiuram disulfide, tetramethyl thiuram monosulfide mercapto benzothiazole, zinc mercaptobenzothiazole, benzothiazole disulfide, etc.

These materials may also be vulcanized without sulfur through the use of nitro compounds and organic peroxides such as trinitrobenzene, tetranitronaphthylene, benzoyl peroxide, a mixture of benzoaldehyde and mercuric oxide, halogenated benzoquinones, benzoquinone dioxime, etc.

Fillers and reinforcing agents and diluents may be used, such as wood flour, cotton flock, alpha flock, mica, asbestos, silica, powdered quartz, bagasse, lignocellulose, hydrolyzed wood, magnesium oxide, magnesium carbonate, clay, lithopone, limestone, etc.

In order that those skilled in the art better may understand how the present invention may be carried into effect, the following examples are given by way of illustration but not by limitation.

*Example 1*

The following compositions were emulsion polymerized using the ratio of 25 parts of polymerizable monomer to about 50 parts of 5% sodium oleate solution in distilled water. As polymerization catalyst there was used 0.25 part of potassium persulfate in the presence of 0.5 part of steel wool as an activator and moderator of the reaction. The polymerizable mixture was introduced into pressure vessels and reacted at 50° C. for at least 12 hours. An oxidation inhibitor, namely, N-phenyl beta naphthyl amine, was added to the resulting latex before precipitation with an aqueous 5% sodium chloride solution containing 2% sulfuric acid. The granulated polymers were washed free of soluble material, dried in a vacuum oven and milled on rolls. The ratio of the polymerizable components is given in the following table:

| Specimen | Styrene | Diethyl Maleate | Butadiene |
| --- | --- | --- | --- |
| A | 30 | 10 | 60 |
| B | 40 | 10 | 50 |
| C | 50 | 10 | 40 |
| D | 60 | 10 | 30 |
| E | 60 | 20 | 20 |
| F | 60 | 30 | 10 |
| G | 70 | 15 | 15 |
| H | 80 | 5 | 15 |
| I | 80 | 10 | 10 |
| J | 80 | 15 | 5 |

All of the above polymers were vulcanizable even those containing small quantities of butadiene. The types of polymer obtained were as follows wherein specimens A and B are recited for comparison:

| Specimen | Characteristics |
| --- | --- |
| A | Rubbery, very elastic, high elongation. |
| B | Rubbery, less elastic than A. |
| C | Ductile vulcanizable which yields readily on bending. |
| D | Similar to C but less yielding. |
| E | Similar to C. |
| F | Tough, more yielding than E. |
| G | Tough, more ductile than F. |
| H | Tough, harder than G. |
| I | Very tough, harder than H. |
| J | Tough, could be flexed without breaking, softer than I but harder than H. |

*Example 2*

Vulcanized products of high utility were obtained by processing samples B, D, E, and F using the following as the ratio of components:

| | Parts |
|---|---|
| Tripolymer | 100 |
| Carbon black | 25 |
| Zinc oxide | 5 |
| Stearic acid | 1 |
| Altax (benzothiazyl disulphide) | 2 |
| Sulfur | 2 |

These compounds were cured at 130° C. for 30 minutes.

The vulcanized products varied from rubbery bodies to hard, tough molded specimens. In compositions containing 40% or more of styrene it may be desirable to accomplish the compounding of the copolymer with the other active ingredients by first swelling the copolymer with volatile hydrocarbon solvents such as hexane, heptane, or benzene, incorporating the vulcanizing ingredients and then removing the solvent by evaporation at normal or reduced temperatures. Compounding of the vulcanizing ingredients likewise may be accomplished by introducing these ingredients into the emulsion or latex prior to precipitation.

Example 3

A varnish solution of the tripolymer of experiment J was prepared by dissolving the tripolymer in benzene to give a 30% solution containing one part of Altax and two parts of sulfur. This varnish solution was used directly as a vulcanizable coating for wood, glass, and as an impregnant and coating for paper, fabric, etc. The adhesion in all cases, even to glass, was excellent.

Example 4

The following ingredients were reacted for 24 hours at 65° C.–70° C. in steam-jacketed reactor equipped with stirrer, etc.

| | Parts |
|---|---|
| Aerosol OT (a dioctyl ester of sodium sulfosuccinic acid) | 25 |
| Distilled water | 500 |
| Styrene | 60 |
| 2-methyl pentadiene-1,3 | 20 |
| Diethyl maleate | 20 |
| Potassium persulfate | 0.5 |

The emulsion was precipitated using a 3% hydrochloric acid solution saturated with sodium chloride. The precipitate was washed in boiling water to remove chlorides and then dried in a vacuum oven under 24 inches of mercury at 50° C. An almost theoretical yield of a tough, flexible, vulcanizable copolymer was obtained.

This case is a continuation in part of application Serial No. 523,897 filed February 25, 1944, now abandoned.

I claim:

1. A resinous copolymerization product of a mixture comprising 50 to 90 parts of a compound of the formula $CH_2=CR'Z$ where R' is selected from the group consisting of hydrogen and a methyl radical and Z is an aryl radical, 5 to 30 parts of a butadiene-1,3 having the formula

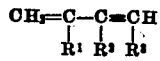

wherein $R^1$ and $R^2$ are selected from the group consisting of hydrogen, alkyl, aryl, chloraryl and a cycloaliphatic radical which is free of ethylenic unsaturation and $R^3$ is selected from the group consisting of hydrogen and methyl, and when $R^3$ is methyl, $R^1$ is methyl and $R^2$ is hydrogen, and 5 to 40 parts of a diester, said diester being the esterification product of maleic acid and an aliphatic monohydric alcohol which is free of ethylenic and acetylenic unsaturation, the major component being selected from the group consisting of the $CH_2=CR'Z$ compound and the diene.

2. The product resulting from vulcanization of the resinous copolymerization product of a mixture comprising 50 to 90 parts of a compound of the formula $CH_2=CR'Z$ where R' is selected from the group consisting of hydrogen and a methyl radical and Z is an aryl radical, 5 to 30 parts of a butadiene-1,3 having the formula

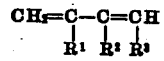

where $R^1$ and $R^2$ are is selected from the group consisting of hydrogen, alkyl, aryl, chloraryl and a cycloaliphatic radical which is free of ethylenic unsaturation and $R^3$ is selected from the group consisting of hydrogen and methyl, and when $R^3$ is methyl, $R^1$ is methyl and $R^2$ is hydrogen, and 5 to 40 parts of a diester, said diester being the esterification product of maleic acid and an aliphatic monohydric alcohol which is free of ethylenic and cetylenic unsaturation, the major component being selected from the group consisting of the $CH_2=CR'Z$ compound and the diene.

GAETANO F. D'ALELIO.

REFERENCES CITED

The following references are of record in the file of this patent:

UNITED STATES PATENTS

| Number | Name | Date |
|---|---|---|
| 2,266,794 | Panwitz et al. | Dec. 23, 1941 |

FOREIGN PATENTS

| Number | Country | Date |
|---|---|---|
| 345,939 | Great Britain | Mar. 16, 1931 |